(12) United States Patent
Carling et al.

(10) Patent No.: US 12,462,597 B2
(45) Date of Patent: Nov. 4, 2025

(54) FINGERPRINT SENSOR WITH IO-VOLTAGE DETERMINING CIRCUITRY

(71) Applicant: FINGERPRINT CARDS ANACATUM IP AB, Gothenburg (SE)

(72) Inventors: David Carling, Mölndal (SE); Allan Olson; Hans Thörnblom, Hålta (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 18/860,835

(22) PCT Filed: May 5, 2023

(86) PCT No.: PCT/SE2023/050440
§ 371 (c)(1),
(2) Date: Oct. 28, 2024

(87) PCT Pub. No.: WO2023/219545
PCT Pub. Date: Nov. 16, 2023

(65) Prior Publication Data
US 2025/0285463 A1 Sep. 11, 2025

(30) Foreign Application Priority Data
May 13, 2022 (SE) .................................. 2250576-2

(51) Int. Cl.
*G06V 40/13* (2022.01)
(52) U.S. Cl.
CPC .............................. *G06V 40/1306* (2022.01)

(58) Field of Classification Search
CPC .. G06V 40/1306; G01R 19/04; G01R 19/165; H03K 5/082; H03K 19/018585; G06F 3/0416
See application file for complete search history.

(56) References Cited

U.S. PATENT DOCUMENTS

| | | | |
|---|---|---|---|
| 5,528,172 | A | 6/1996 | Sundstrom |
| 5,751,166 | A | 5/1998 | Shieh et al. |
| 5,969,554 | A | 10/1999 | Chan et al. |
| 6,072,334 | A | 6/2000 | Chang |
| 6,212,402 | B1 | 4/2001 | Rubbmark et al. |
| 8,179,161 | B1 | 5/2012 | Williams et al. |

(Continued)

OTHER PUBLICATIONS

International Search Report and Written Opinion for corresponding International Application No. PCT/SE2023/050440, filed May 5, 2023, dated May 22, 2023, 13 pages.

*Primary Examiner* — Abhishek Sarma
(74) *Attorney, Agent, or Firm* — Westman, Champlin & Koehler, P.A.

(57) ABSTRACT

A fingerprint sensor, comprising fingerprint sensing circuitry configured to sense a fingerprint of a finger, and to provide a representation of the fingerprint; a sensor interface coupled to the fingerprint sensing circuitry, and comprising at least a first input pad for input to the fingerprint sensor of at least a first digital signal, and at least one output pad for output from the fingerprint sensor of a digital data signal encoding the representation of the fingerprint; and IO-voltage determining circuitry coupled to the first input pad and configured to sense a voltage level of the first digital signal, and to determine, based on the sensed voltage level of the first digital signal, a nominal voltage level to use for the digital data signal encoding the representation of the fingerprint.

14 Claims, 3 Drawing Sheets

(56) References Cited

U.S. PATENT DOCUMENTS

2004/0246022 A1 12/2004 Haulin
2017/0308730 A1 10/2017 Sundblad et al.
2019/0026521 A1 1/2019 Du

FINGERPRINT SENSOR WITH IO-VOLTAGE DETERMINING CIRCUITRY

CROSS-REFERENCE TO RELATED APPLICATION

This Application is a Section 371 National Stage Application of International Application No. PCT/SE2023/050440, filed May 5, 2023 and published as 2023/219545 on Nov. 16, 2023, in English, which claims priority to Swedish Application No. 2250576-2, filed May 13, 2022, the contents of which are hereby incorporated by reference in their entirety.

FIELD OF THE INVENTION

The present invention relates to a fingerprint sensor, and to an electronic device comprising the fingerprint sensor.

BACKGROUND OF THE INVENTION

Biometric systems are widely used as means for increasing the convenience and security of personal electronic devices, such as mobile phones etc. Fingerprint sensors, in particular, are now included in a large proportion of all newly released personal communication devices, such as mobile phones.

For operation of fingerprint sensing circuitry, as well as other circuitry internal to the fingerprint sensor, the fingerprint sensor is typically provided with a supply voltage, which is a difference between a reference potential and a supply potential. In existing electronic devices with fingerprint sensors, the fingerprint sensor is additionally provided with an IO supply voltage, which is a difference between the reference potential and an IO supply potential. The IO supply voltage (IO supply potential) determines how digital signals supplied to the fingerprint sensor are interpreted by the fingerprint sensor, and also defines the nominal voltage level that the fingerprint sensor uses for digital data output by the fingerprint sensor, such as digital data encoding a representation of a fingerprint acquired by the fingerprint sensor.

According to another, more flexible approach for setting the IO supply voltage, an integrated circuit may include a dedicated input for receiving a signal indicating a desired IO supply voltage. Based on this signal, a programmable input/output circuit in the integrated circuit may internally generate the desired IO supply voltage. This approach is described in U.S. Pat. No. 8,179,161.

A consequence of each of the two approaches outlined above is that a dedicated bond pad is required, and another consequence is that specific requirements are imposed on the circuitry that is communicating with the integrated circuit. Neither of these consequences is desirable, in particular for a fingerprint sensor with very limited available space for bond pads.

SUMMARY

In view of the above, it is an object of the present invention to provide an improved fingerprint sensor, in particular a fingerprint sensor with improved determination of the IO-voltage of the fingerprint sensor.

According to the present invention, it is therefore provided a fingerprint sensor, comprising: fingerprint sensing circuitry configured to sense a fingerprint of a finger, and to provide a representation of the fingerprint; a sensor interface coupled to the fingerprint sensing circuitry, and comprising at least a first input pad for input to the fingerprint sensor of at least a first digital signal for controlling operation of the fingerprint sensor, and at least one output pad for output from the fingerprint sensor of a digital data signal encoding the representation of the fingerprint; and IO-voltage determining circuitry coupled to the first input pad and configured to sense a voltage level of the first digital signal, and to determine, based on the sensed voltage level of the first digital signal, a nominal voltage level to use for the digital data signal encoding the representation of the fingerprint.

The nominal voltage level to use for the digital data signal encoding the representation of the fingerprint is the voltage level, in relation to a reference potential, that is taken to represent the logic high level of the digital data signal. Common nominal voltage levels that are currently used include, for example, 1.2 V, 1.8 V, 3.3 V, etc.

The present invention is based on the realization that digital signals that are provided to the fingerprint sensor contain information about the nominal voltage level used by the circuitry that is communicating with the fingerprint sensor. A further realization is that, in substantially every meaningful use case, any output of data from a fingerprint sensor will be preceded by the fingerprint sensor receiving at least one digital signal for controlling operation of the fingerprint sensor. The inventors have therefore realized that the voltage level of a suitable digital signal for controlling operation of the fingerprint sensor can be sensed, and that the nominal voltage level to use for output data can be determined based on the sensed voltage level. The digital signal for controlling operation of the fingerprint sensor may, for example, be a control signal or a data signal containing instructions for the fingerprint sensor.

Hereby, no pad dedicated to the supply or determination of the IO-voltage is needed, and no requirements are imposed to explicitly communicate regarding the desired IO-voltage/nominal voltage level. This simplifies the design and integration of the fingerprint sensor, and also provides for a more compact fingerprint sensor and/or an elongated fingerprint sensor with a large aspect ratio.

According to embodiments, the determination of the nominal voltage level may take place following startup/activation of the fingerprint sensor, and the determined nominal voltage level may be considered to be valid until the fingerprint sensor is powered down/deactivated. According to other embodiments, the voltage level of the first digital signal may be sensed repeatedly between the startup/activation and the power-down/deactivation of the fingerprint sensor, and a new determination of the nominal voltage level may take place every time the voltage level has been sensed. For instance, a new determination of the nominal voltage level may take place in preparation of every scheduled or requested output of digital data from the fingerprint sensor.

In either case, the first input pad—for input of the first digital signal—may be selected such that the first digital signal is at a logic high level before, or at a start of, a scheduled or requested period for output from the fingerprint sensor of the digital data signal encoding the representation of the fingerprint.

This allows determination of the correct nominal voltage before output of digital data from the fingerprint sensor, reducing the risk of misinterpretation of the digital data or, potentially, damage to other external circuitry connected to the sensor interface for receiving digital data from the fingerprint sensor.

Advantageously, the first digital signal may be one of a reset signal and an enable signal, for enabling or selecting the fingerprint sensor for communication.

According to embodiments, the IO-voltage determining circuitry may be configured to determine the nominal voltage level by selecting between a predefined first nominal voltage level and a predefined second nominal voltage level, higher than the first nominal voltage level.

Furthermore, the sensor interface advantageously may be configured to control at least one output pads in the sensor interface to a logic low level, to a tri-state level, or to the predefined first nominal voltage level before the IO-voltage determining circuitry has determined the nominal voltage level to use for the digital data signal encoding the representation of the fingerprint.

According to various embodiments, the first digital signal may advantageously be selected as a reset signal that is active low. "Active low" is an established term with the meaning that the control by the first digital signal is effected by a transition from the logic high level to the logic low level. In the context of embodiments of the present invention, this implies that the desired information about the nominal voltage level to use can be acquired and used before any action of the fingerprint sensor is required by the circuitry communicating with the fingerprint sensor. This reduces the risk of the fingerprint sensor using an incorrect IO-voltage (nominal voltage level), which could otherwise result in incorrect interpretation of output data and/or damage to connected circuitry.

The fingerprint sensor according to embodiments of the present invention may advantageously be included in an electronic device, further comprising a device controller coupled to the sensor interface of the fingerprint sensor for controlling operation of the fingerprint sensor and for acquiring digital data encoding the representation of the fingerprint from the fingerprint sensor.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensor according to the present invention are mainly described with reference to a fingerprint sensor component including a semiconductor-based capacitive fingerprint sensor integrated circuit (IC). The finger receiving surface of the fingerprint sensor is mainly exemplified as a convex surface. It should be noted that the present invention, as defined by the claims, is not limited to any particular shape or configuration of the finger receiving surface. Moreover, the fingerprint sensor does not have to be elongated, but could be any other shape, such as square or round, etc.

Furthermore, it should be understood that the mobile phone in the figures is only one example of an electronic device that may comprise the fingerprint sensor according to embodiments of the present invention. The fingerprint sensor according to embodiments of the present invention may advantageously be included in many other electronic devices, including, for example, computers, electronic watches and other gadgets, as well as smart cards, etc.

Figure 1:
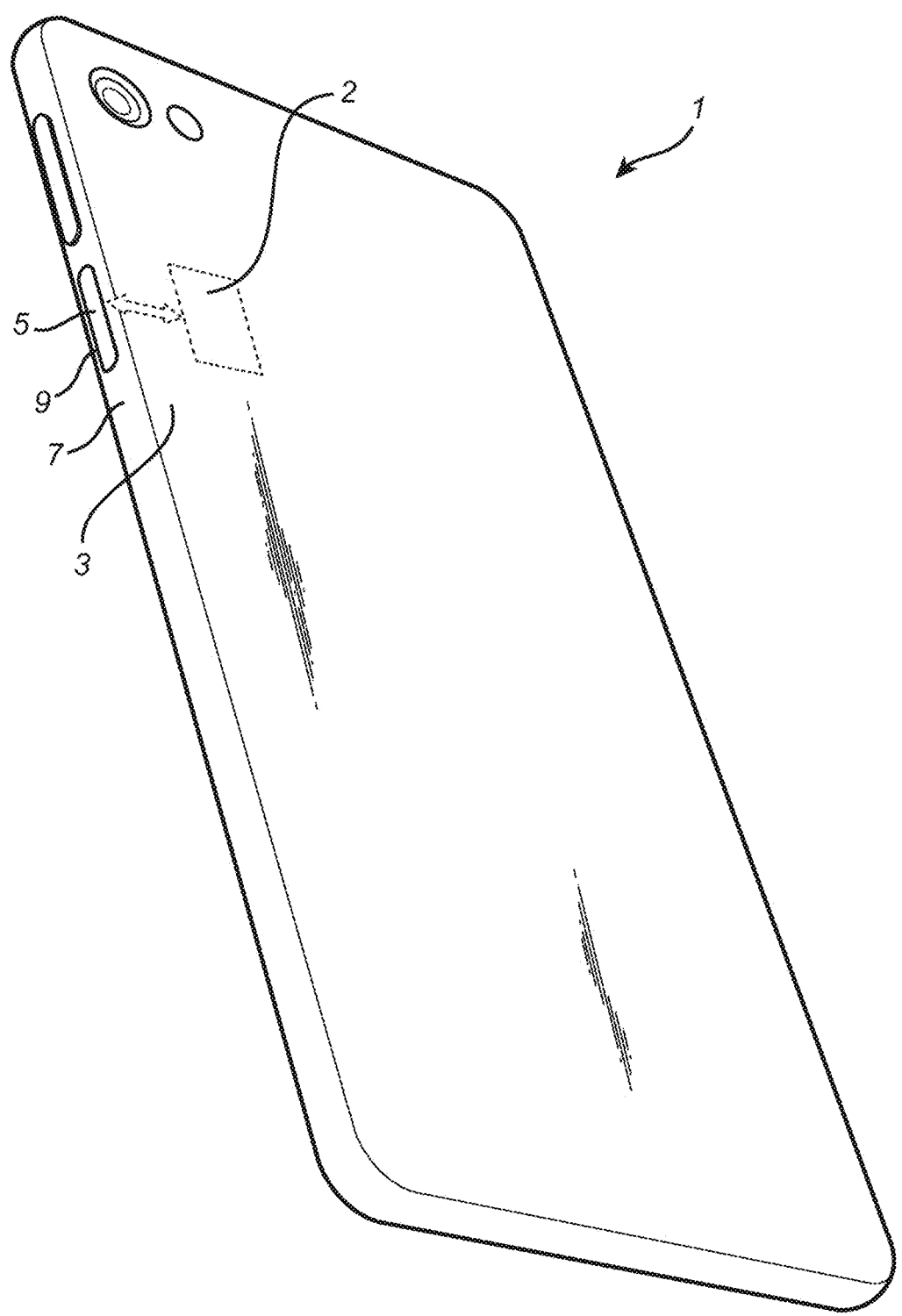
FIG. 1 is an illustration of an exemplary electronic device comprising a fingerprint sensor according to an embodiment of the present invention, in the form of a mobile phone.

FIG. 1 schematically shows an electronic device, here in the form of a mobile phone 1, comprising a device housing 3 and an exemplary fingerprint sensor component 5. As can be seen in FIG. 1, the device housing 3 has a convex portion 7 with an opening 9. The fingerprint sensor component 5 is arranged in the opening 9 and, in this particular example configuration, also exhibits a convex shape. The convex shape of the fingerprint sensor component 5 may substantially follow the convex shape of the convex portion 7 of the device housing 3, at least at the opening 9.

Figure 2:
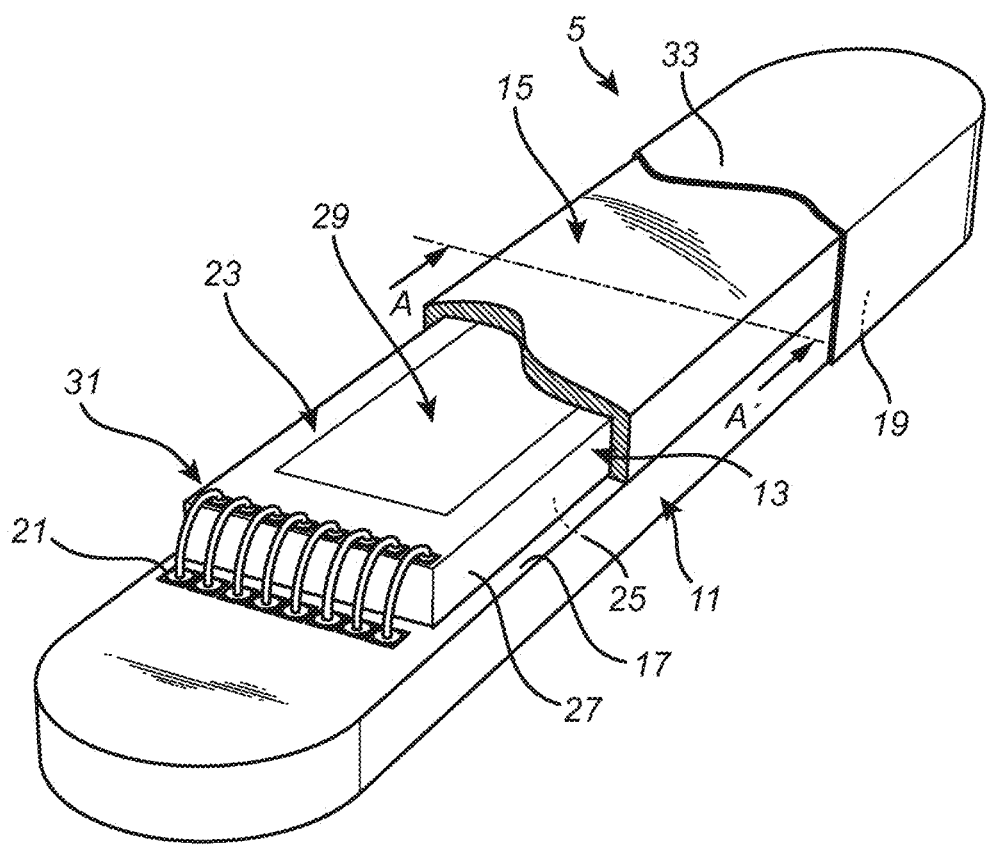
FIG. 2 is a partly opened perspective schematic illustration of the fingerprint sensor comprised in the electronic device in FIGS. 1.

FIG. 2 is a partly opened perspective schematic illustration of the exemplary fingerprint sensor component 5 comprised in the mobile phone 1 in FIG. 1. Referring to FIG. 2, the fingerprint sensor component 5 comprises a substrate 11, a fingerprint sensor 13, and a dielectric material 15. The substrate 11 has a substrate top face 17 and a substrate bottom face 19. The substrate top face 17 has a top face conductor pattern, including bond pads 21 visible in FIG. 2, and (although not visible in FIG. 2) the substrate bottom face 19 may have a bottom face conductor pattern, which may form a component conductor pattern for electrical connection of the fingerprint sensor component 5 to circuitry of the electronic device 1. The fingerprint sensor 13 has a top face 23, a bottom face 25, and a side surface 27 connecting the top face 23 and the bottom face 25. The top face 23 includes a planar sensing surface 29. The bottom face 25 of the fingerprint sensor 13 is, in this example configuration, bonded to the substrate top face 17 of the substrate 11. As is schematically indicated in FIG. 2, the fingerprint sensor 13 further comprises connection pads, collectively denoted by reference numeral 31, embodying a sensor interface of the fingerprint sensor 13.

In the example configuration of the fingerprint sensor component 5 in FIG. 2, the dielectric material 15 covers the sensing surface 29 and the side surface 27 of the fingerprint sensor 13, as well as a portion of the substrate top face 17 of the substrate 11 that is not covered by the fingerprint sensor 13. As is schematically indicated in FIG. 2, the dielectric material 15 exhibits a convex shape over the sensing surface 29 of the fingerprint sensor 13. The fingerprint sensor component 5 may optionally additionally include a colored coating 33 on top of the dielectric material 15.

Figure 3:
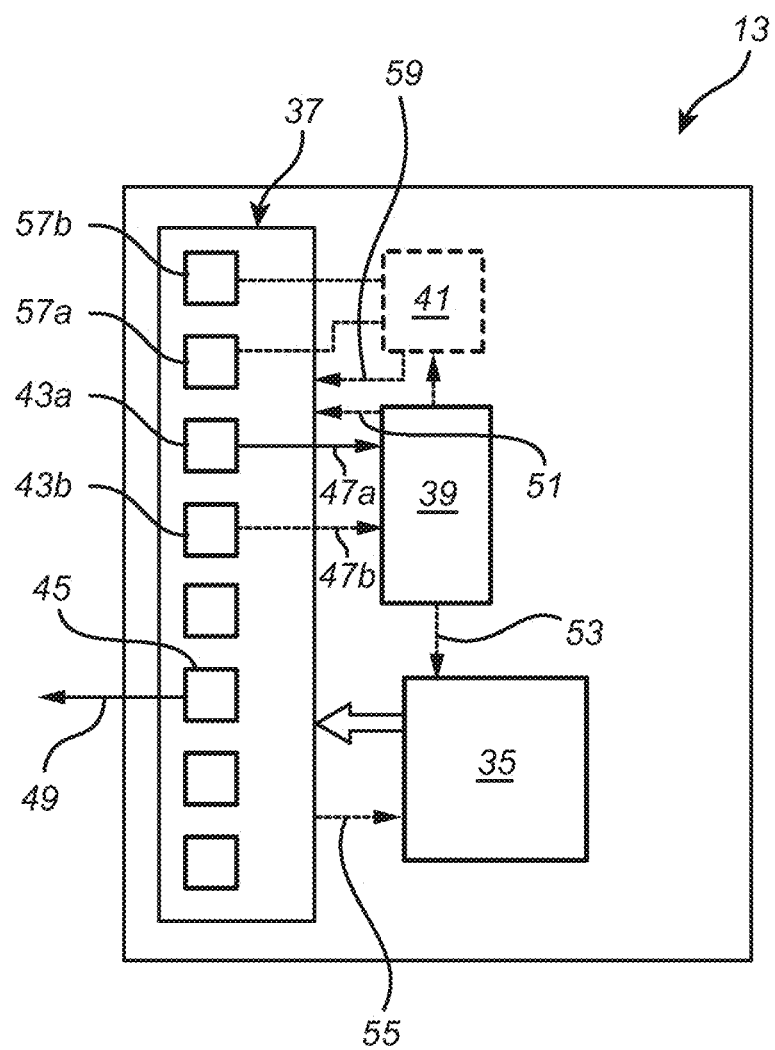
FIG. 3 is a simplified schematic block diagram of a fingerprint sensor according to an example embodiment of the present invention.

FIG. 3 is a simplified schematic block diagram of a fingerprint sensor 13 according to an example embodiment of the present invention. Referring to FIG. 3, the fingerprint sensor 13 comprises fingerprint sensing circuitry 35, a sensor interface 37, and IO-voltage determining circuitry 39. As is schematically indicated in FIG. 3, the fingerprint sensor 13 may optionally additionally comprise IO-voltage providing circuitry 41.

The fingerprint sensing circuitry 35 is configured to sense a fingerprint of a finger. Various types of suitable fingerprint sensing circuitry 35 are, per se, well-known to those of ordinary skill in the art of fingerprint sensing. Therefore, the fingerprint sensing circuitry 35 will not be described in detail herein.

The sensor interface 37 is coupled to the fingerprint sensing circuitry 35, and comprises at least a first input pad 43a, and at least one output pad 45. The first input pad 43a is adapted to receive a first digital signal for controlling operation of the fingerprint sensor 13, and the output pad 45 is adapted to output from the fingerprint sensor 13 digital data encoding a representation of the fingerprint provided by the fingerprint sensing circuitry 35.

The IO-voltage determining circuitry 39 is coupled to the first input pad 43a and configured to sense a voltage level of the first digital signal, and to determine, based on the sensed voltage level of the first digital signal, a nominal voltage level to use for the digital data signal 49 encoding the representation of the fingerprint, which is output from the fingerprint sensor 13 via the output pad 45.

The IO-voltage determining circuitry may determine the nominal voltage level to use for the digital output from the fingerprint sensor 13 in various ways. Some examples are provided below, and based on these and his knowledge in the field, the skilled person will be able to come up with alternative solutions if desired.

According to one example configuration, the IO-voltage determining circuitry 39 may be configured to sense the voltage level of the first digital signal 47a at least during a predetermined time period before determining the nominal voltage level to use for the digital data signal 49 encoding the representation of the fingerprint. For instance, the voltage level of the first digital signal 47a may be repeatedly sampled, resulting in a time-series of voltage level samples, and the voltage samples acquired during at least the predetermined time period may be filtered to obtain a stable and reliable sensed voltage level. Various filtering techniques are, per se, well known to the skilled person, and may, for example, involve averaging. The filtered sensed voltage level may then be compared with a (one or more) predefined threshold to determine the nominal voltage level to use for the digital data signal 49 encoding the representation of the fingerprint.

In embodiments, the IO-voltage determining circuitry 39 may be configured to determine the nominal voltage level by selecting between a predefined first nominal voltage level and a predefined second nominal voltage level, higher than the first nominal voltage level. A non-limiting example of such a predefined first nominal voltage level may be 1.2 V, and a non-limiting example of such a predefined second nominal voltage level may be 1.8 V.

In such embodiments, the IO-voltage determining circuitry 39 may comprise a comparator (not explicitly shown in FIG. 3) configured to compare the sensed voltage level of the first digital control signal 43a with a predefined threshold voltage that is higher than the first nominal voltage level and lower than the second nominal voltage level.

The sensed voltage level that is compared may be the above-described filtered sensed voltage level. Alternatively, or in combination, the IO-voltage determining circuitry 39 may be configured to select one of the first nominal voltage level and the second nominal voltage level only after at least two sequential comparisons by the comparator (or two sequential samples of an analog comparator output signal) providing the same comparison result. This is, in effect, also a filtering procedure, but integrated in the comparison step.

To reduce the risk of the fingerprint sensor 13 using an incorrect nominal voltage level at a time when that may have undesirable consequences, the first digital signal 47a may advantageously be selected as a signal that can be expected to be at the logic high level when the fingerprint sensor is in operation. An advantageous example of such a signal is a reset signal that is active low, which may be denoted RST_N. Because the RST_N-signal goes from the logic low level to the logic high level to release the reset of the fingerprint sensor 13, and only goes to the logic low level to reset the fingerprint sensor 13, the logic high level used by the RST_N-signal can be sampled and/or compared at any time following activation (released reset) of the fingerprint sensor. 13.

In example embodiments, such as the example embodiment in FIG. 3, the sensor interface may comprise the above-mentioned reset input 47a, and an SPI (serial peripheral interface) interface, which is well known to the skilled person. The first digital control signal 47a may thus advantageously be the RST_N-signal or the CS_N-signal (in typical terminology of the SPI interface).

To further improve the accuracy of the determination of the nominal voltage level to use, the sensor interface 37 may optionally further comprise a second control input pad 43b for input to the fingerprint sensor 13 of a second digital control signal 47b, and the IO-voltage determining circuitry 39 may optionally further be configured to sense a voltage level of the second digital control signal 47b and to determine the nominal voltage level to use for the digital data signal 49 additionally based on the sensed voltage level of the second digital control signal 47b. What has been said further above regarding the sensing of the voltage level of the first digital control signal 47a naturally applies also to the sensing of the voltage level of the second digital control signal 47b. For instance, the first digital control signal 47a may be the above-mentioned RST-N-signal, and the second digital control signal 47b may be the above-mentioned CS_N-signal, or vice-versa.

To reduce the risk of output of incorrect data and/or damage to connected circuitry, etc, the sensor interface 37 may be configured to control at least one output pad 45 in the sensor interface 17 to a logic low level or to a tri-state level or to the above-mentioned predefined first nominal voltage level before the IO-voltage determining circuitry has determined the nominal voltage level to use for the digital data signal encoding the representation of the fingerprint.

As is schematically indicated in FIG. 3 by the dashed arrow 51 from the IO-voltage determining circuitry 39 to the sensor interface 37, the IO-voltage determining circuitry 39 may control the sensor interface 37 in dependence on the determined nominal voltage level. In particular, the sensor interface 37 may be configured to translate the first digital signal 47a (and optionally any other digital signal) to logic values for control of the fingerprint sensor 13, based on the nominal voltage level determined by the IO-voltage determining circuitry 39.

Alternatively, or in combination, the fingerprint sensing circuitry 35 may be controllable to translate received digital signals to logic values and/or to use the nominal voltage determined by the IO-voltage determining circuitry 39 for the digital data signal 49 encoding the representation of the fingerprint. As is schematically indicated in FIG. 3 by the dashed arrow 53 from the IO-voltage determining circuitry 39 to the fingerprint sensing circuitry 35, the IO-voltage determining circuitry 39 may provide the determined nominal voltage level to the fingerprint sensing circuitry 35. Alternatively, the nominal voltage level may be provided to the fingerprint sensing circuitry 35 via the sensor interface 37, as is schematically indicated in FIG. 3 by the dashed arrow 55 from the sensor interface 37 to the fingerprint sensing circuitry 35.

According to embodiments, furthermore, the sensor interface 37 may comprise a first power supply pad 57a for receiving a reference potential and a second power supply pad 57b for receiving a supply potential, a difference between the supply potential and the reference potential being a supply voltage for the fingerprint sensor 13, and the fingerprint sensor 13 may further comprise the above-mentioned optional IO-voltage providing circuitry 41 coupled to the IO-voltage determining circuitry 39 and to the first 57a and second 57b power supply pads. The IO-voltage providing circuitry 41 may be configured to provide the nominal voltage level to use for the digital data signal 49 encoding the representation of the fingerprint.

In FIG. 3, this provision of the nominal voltage level from the IO-providing circuitry 41 is exemplified by the dashed arrow 59 to the sensor interface 37. Alternatively, or in combination, the nominal voltage level may be provided to the IO-voltage determining circuitry 39 and/or the fingerprint sensing circuitry 35.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A fingerprint sensor, comprising:
   fingerprint sensing circuitry configured to sense a fingerprint of a finger, and to provide a representation of the fingerprint;
   a sensor interface coupled to the fingerprint sensing circuitry, and comprising at least a first input pad for input to the fingerprint sensor of at least a first digital signal for controlling operation of the fingerprint sensor, and at least one output pad for output from the fingerprint sensor of a digital data signal encoding the representation of the fingerprint; and
   IO-voltage determining circuitry coupled to the first input pad and configured to sense a voltage level of the first digital signal, and to determine, based on the sensed voltage level of the first digital signal, a nominal voltage level to use for the digital data signal encoding the representation of the fingerprint,
   wherein the first input pad is selected such that the first digital signal is at a logic high level before, or at a start of, a period for output from the fingerprint sensor of the digital data signal encoding the representation of the fingerprint.

2. The fingerprint sensor according to claim 1, wherein the first digital signal is one of a reset signal and an enable signal.

3. The fingerprint sensor according to claim 1- or 2, wherein the IO-voltage determining circuitry is configured to determine the nominal voltage level by selecting between a predefined first nominal voltage level and a predefined second nominal voltage level, higher than the first nominal voltage level.

4. The fingerprint sensor according to claim 3, wherein the IO-voltage determining circuitry comprises a comparator configured to compare the sensed voltage level of the first digital signal with a predefined threshold voltage that is higher than the first nominal voltage level and lower than the second nominal voltage level.

5. The fingerprint sensor according to claim 4, wherein the IO-voltage determining circuitry is configured to select one of the first nominal voltage level and the second nominal voltage level only after at least two sequential comparisons by the comparator providing the same comparison result.

6. The fingerprint sensor according to claim 3, wherein the sensor interface is configured to control at least one output pad in the sensor interface to a logic low level, to a tri-state level, or to the predefined first nominal voltage level before the IO-voltage determining circuitry has determined the nominal voltage level to use for the digital data signal encoding the representation of the fingerprint.

7. The fingerprint sensor according to claim 1, wherein the first digital signal is an active low reset signal.

8. The fingerprint sensor according to claim 1, wherein the sensor interface is configured to translate the first digital signal to logic values for control of the fingerprint sensor, based on the nominal voltage level determined by the IO-voltage determining circuitry.

9. The fingerprint sensor according to claim 1, wherein:
   the sensor interface further comprises a second input pad for input to the fingerprint sensor of a second digital signal; and
   the IO-voltage determining circuitry is configured to sense a voltage level of the second digital signal and to determine the nominal voltage level to use for the digital data signal additionally based on the sensed voltage level of the second digital signal.

10. The fingerprint sensor according to claim 9, wherein the second digital signal is an enable signal.

11. The fingerprint sensor according to claim 1, wherein:
    the sensor interface further comprises a first power supply pad for receiving a reference potential and a second power supply pad for receiving a supply potential, a difference between the supply potential and the reference potential being a supply voltage for the fingerprint sensor; and the fingerprint sensor further comprises:
    IO-voltage providing circuitry coupled to the IO-voltage determining circuitry, the first power supply pad and the second power supply pad, and configured to provide the nominal voltage level to use for the digital data signal encoding the representation of the fingerprint.

12. The fingerprint sensor according to claim 1, wherein the IO-voltage determining circuitry is configured to sense the voltage level of the first digital signal at least during a predetermined time period before determining the nominal voltage level to use for the digital data signal encoding the representation of the fingerprint.

13. The fingerprint sensor according to claim 1, wherein:
    the sensor interface comprises an SPI-interface and a reset signal input configured to receive an active low reset signal; and
    the first digital signal is the active low reset signal or the CS_N-signal included in the SPI-interface.

14. An electronic device comprising:
    the fingerprint sensor according to claim 1; and
    a device controller coupled to the sensor interface of the fingerprint sensor for controlling operation of the fingerprint sensor and for acquiring digital data encoding the representation of the fingerprint from the fingerprint sensor.

* * * * *